United States Patent [19]

Maeno

[11] Patent Number: 4,942,569
[45] Date of Patent: Jul. 17, 1990

[54] CONGESTION CONTROL METHOD FOR PACKET SWITCHING APPARATUS

[75] Inventor: Junichi Maeno, Akikawa, Japan

[73] Assignee: Kabushiki Kaisha Toshiba, Kawasaki, Japan

[21] Appl. No.: 314,865

[22] Filed: Feb. 24, 1989

[30] Foreign Application Priority Data

Feb. 29, 1988 [JP] Japan .................................. 63-46812

[51] Int. Cl.⁵ ................................................ H04J 3/26
[52] U.S. Cl. ...................................... 370/60; 370/85.6
[58] Field of Search ................ 370/60, 61, 94, 94.1, 370/85.6

[56] References Cited

U.S. PATENT DOCUMENTS

| | | | |
|---|---|---|---|
| 4,607,363 | 8/1986 | Platel et al. | 370/61 |
| 4,757,529 | 7/1988 | Glapa et al. | 470/60 |
| 4,769,811 | 9/1988 | Eckberg, Jr. et al. | 370/60 |
| 4,864,560 | 9/1989 | Quinquis et al. | 370/60 |

Primary Examiner—Douglas W. Olms
Assistant Examiner—Melvin Marcelo
Attorney, Agent, or Firm—Finnegan, Henderson, Farbow, Garrett and Dunner

[57] ABSTRACT

One technique of a congestion control method for packet switching apparatuses, in which a plurality of priority data indicative of different demands, such as a first priority data indicative of immediateness priority and a second priority data indicative of necessity priority, are attached to each packet. In congestion of a packet queue, such control is carried out that such a packet as having the high first immediateness priority is rearranged as located in the front part of the queue while such a packet as having the high first immediateness priority but having the low second necessity priority is first discarded according to the first and second priority data of the packets, whereby major demands for the each packet are concurrently satisfied. For example, a packet of data transferred between telephone set terminals has a strong immediateness demand but has a relatively weak necessity demand, whereas, a packet of data transferred between data terminals has a relatively weak immediateness demand but has a strong necessity demand.

6 Claims, 6 Drawing Sheets

CONGESTION CONTROL METHOD FOR PACKET SWITCHING APPARATUS

BACKGROUND OF THE INVENTION

1. Field of the Invention

The present invention relates to a method of controlling the congestion of packets received by a packet switching apparatus and, more particularly, to a method of realizing packet communication with high flexibility and less loss on the basis of the priority order of packets suitably determined by the data types of the packets.

2. Description of the Related Art

Figure 1:
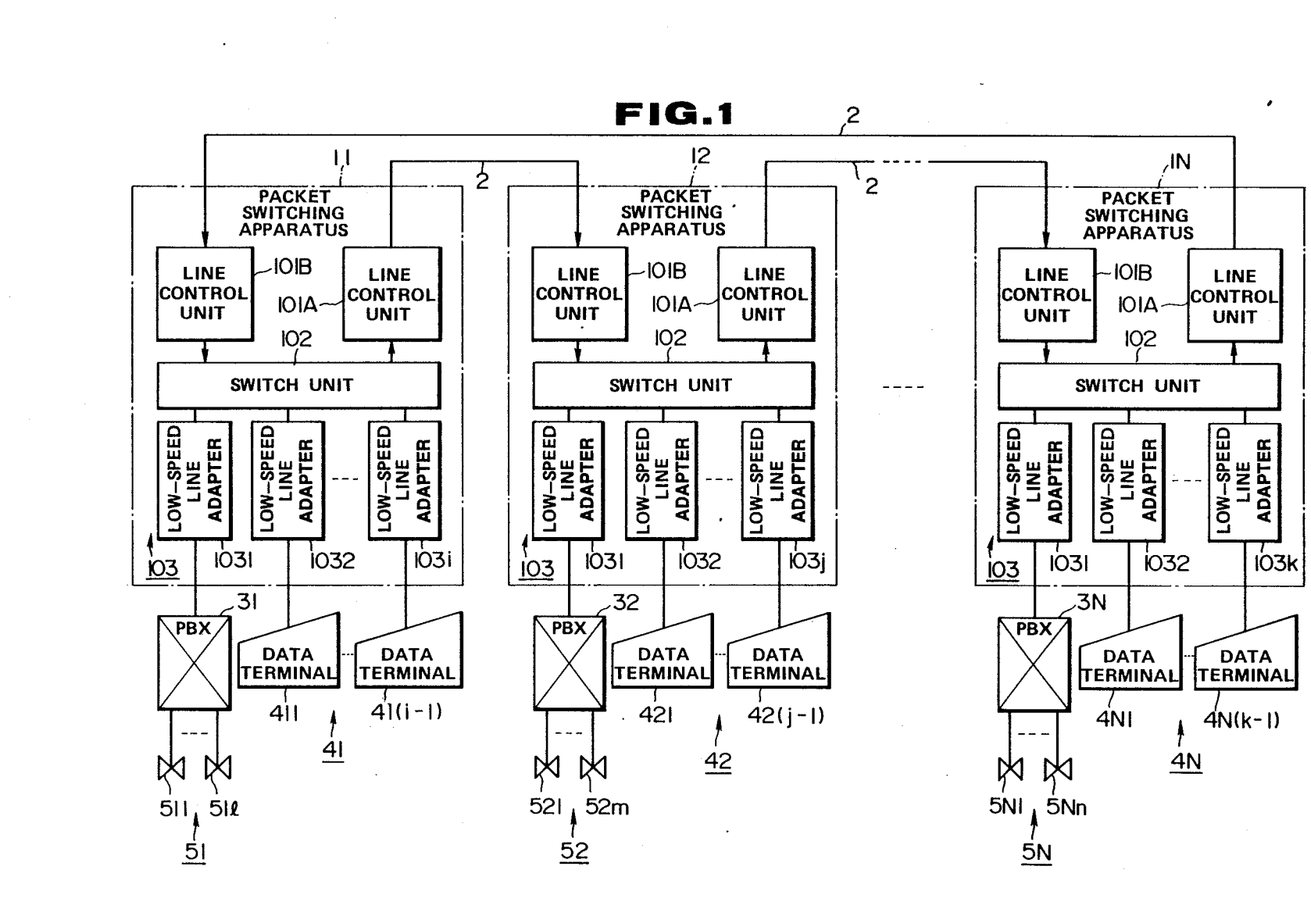
FIG. 1 is a block diagram showing an exemplary arrangement of a packet communication network to which the present invention is applied.
Figure 1O:
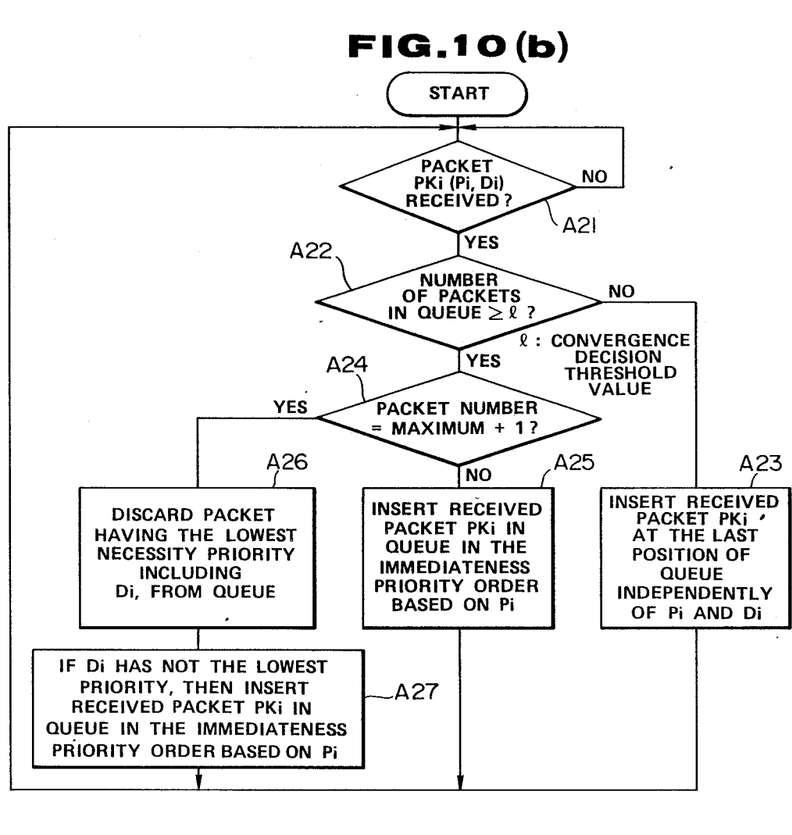

Shown in FIG. 1 is an exemplary arrangement of a packet communication network, in which a plurality of packet switching apparatuses 11 to 1N are interconnected by respective communication lines 2. More specifically, these packet switching apparatuses 11 to 1N are connected through suitable communication lines to associated private branch exchanges (PBX) 31 to 3N and associated data terminal groups 41 to 4N, which terminal groups in turn include terminals 411 to 41(i−1), 421 to 42(j−1), . . . and 4N1 to 4N(k−1) respectively, as illustrated in FIG. 1. The private branch exchanges 31 to 3N are connected to associated telephone set groups 51 to 5N, which groups in turn include telephone sets 511 to 51l, 521 to 52m, . . . and 5N1 to 5Nn as shown in the drawing.

Explanation will now be made as to the specific arrangement and operation of the aforementioned packet switching apparatuses.

Each of the packet switching apparatuses, as shown in FIG. 1, comprises two sending and receiving line control units 101A and 101B, a switch unit 102 for performing packet transfer between the line control units 101A, 101B and corresponding nodes, and a low speed line adapter group 103 (which corresponds to the aforementioned nodes) connected to an associated one of the private branch exchanges 31 to 3N or an associated one of the data terminal groups 41 to 4N to perform switching from data to packet or from packet to data between the switch unit 102 and the associated one of the private branch exchanges 31 to 3N and data terminal groups 41 to 4N. The low speed line adapter group 103 includes low speed line adapters 1031 to 103i, 1031 to 103j, . . . or 1031 to 103k.

Figure 2:
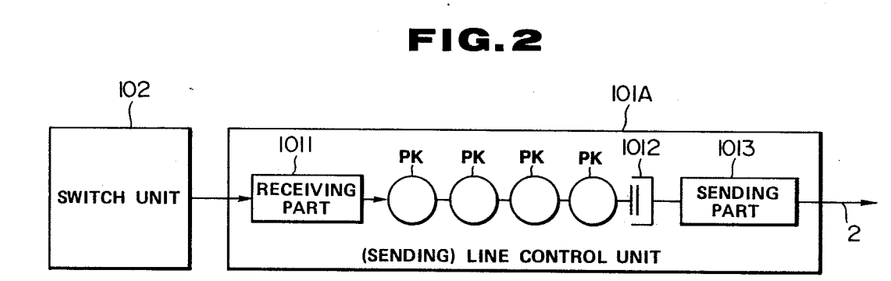
FIGS. 2 and 3 are block diagrams showing, in a model form, the interior arrangements of sending and receiving line control units shown in FIG. 1, respectively.
Figure 3:
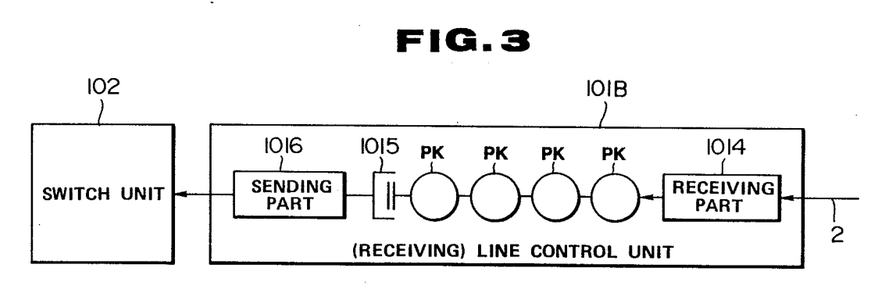

The sending line control unit 101A, as shown in FIG. 2, has a receiving part 1011 for receiving and processing packets PK received from the switch unit 102, a queuing part 1012 (made up of a buffer memory or the like) for temporarily holding the received packets PK sequentially, and a sending part 1013 for extracting the temporarily held packets PK in the queuing order and sending them to the associated communication line 2. The receiving line control unit 101B, on the other hand, has, as shown in FIG. 3, a receiving part 1014 for receiving and processing packets PK received from the associated communication line 2, a queuing part 1015 for temporarily holding the received packets PK sequentially, and a sending part 1016 for extracting the temporarily held packets PK in the queuing order and sending them to the associated switch unit 102.

The switch unit 102, when performing the packet transfer between the line control units 101A, 101B and the corresponding nodes, is arranged so that, with respect to the packets transmitted and received from the node side, the switch unit sends the received packets to the associated sending line control unit 101A, utilizing an idle transmission time or during every time period when the terminal connected to its own station (packet switching apparatus) comes to its turn in the sending order previously allocated to the terminal. With respect to the packets transmitted and received from the receiving line control unit 101B, the switch unit collates the destination addresses of the received packets and in the presence of the corresponding address, provides the corresponding packet to the corresponding node (the low speed line adapter group 103) and in the absence of such address, transfers the corresponding packet as it is to the sending line control unit 101A within its own packet switching apparatus.

The low speed line adapters 103, which correspond to the nodes of the respective packet switching apparatuses and to which particular addresses are respectively allocated, are arranged so as to perform a switching operation. More specifically each low speed line adapter 103 is arranged so that, with respect to the packet received from the switch unit 102, the adapter extracts a data part from the received packet and outputs the extracted data to the private branch exchange or data terminal connected thereto (switching from packet to data). With respect to the data including destination information) received from the private branch exchange or data terminal connected to the adapter, the adapter arranges the received data in a predetermined format to prepare a packet and sends the formatted packet to the associated switch unit 102 (within its own packet switching apparatus (switching from data to packet).

The packet switching apparatuses 11 to 1N, which respectively comprise the line control units 101A and 101B, the switch units 102 and the low speed line adapters 103 and which are interconnected by means of the associated communication lines 2 to form a data link, will execute the packet switching operation in the following manner. More specifically, in these packet switching apparatuses 11 to 1N, the receiving line control unit 101B first receives the packets sent from the associated communication line 2, the switch unit 102 extracts sequentially the packets one by one from the line control unit 101B and retrieves the extracted packets on the basis of their destination addresses to determine whether or not each packet is related to its own station (packet switching apparatus). If the packet is related to its own station, the switch unit 102 provides the extracted packet to the associated low speed line adapter corresponding to the destination address of the station and the associated adapter sends data contents included in the packet in question to the associated terminal (private branch exchange or data terminal). When the switch unit 102 decides that the extracted packet is not related to its own station, the switch unit sends the same packet to the associated sending line control unit 101A from which the packet is further transferred to the associated communication line 2.

With respect to the data sent from the terminals (private branch exchanges or data terminals) connected to the packet switching apparatuses 11 to 1N, the data is arranged at the associated low speed line adapter into a packet form (including the destination address), the prepared packet is sent under control of the associated switch unit 102 to its own sending line control unit 101A utilizing an idle transmission time or during every time period when the terminal in question comes to its turn in the preallocated sending order. The line control unit 101A temporarily holds the same packet, sequentially extracts the held packets one by one and sends them out to the associated communication line 2.

Connected as the aforementioned terminals to the private branch exchanges 31 to 3N are such groups of telephone sets 51 to 5N as already explained earlier, voice signals from which telephone sets are converted into suitably coded data (which will be referred to as voice data, hereinafter). That is, in the packet communication network shown in FIG. 1, roughly two sorts of packets, that is, terminal data packets and voice data packets are communicated and transferred between the packet switching apparatuses 11 to 1N. The terminal data packet is obtained by arranging into a packet form the data (hereinafter, which will be referred to as terminal data in distinction from the voice data) transferred between the data terminal groups 41 to 4N for various control, calculations, data communication and the like, while, the voice data packet is obtained by arranging the voice data into a packet form.

Figure 4:
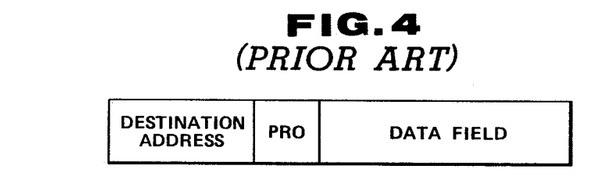
FIG. 4 is a schematic diagram showing a structure of a packet used in a prior art congestion control method for packet switching apparatuses.

Since the capacity of the queuing part in the line control part in each of the packet switching apparatuses is generally restricted, each time such excessive packets as causes the overflow of the queuing part are applied to the queuing part, the overflow packets are discarded to keep the queuing part in its normal state. In this connection, if the discarded packets correspond to the voice data packets, then the loss of such voice data packets will incur a disadvantage that there occurs a break in the reproduced voice but will not affect, as a whole, the communication network to a large extent. When the discarded packets correspond to the terminal data packets, however, the loss of the terminal data packets will provide a fatal defect to the communication network. For this reason, the prior art structure of each packet has been such that, as shown in FIG. 4, a priority data PRO is added and when the queue of these packets are converged, these converged packets are rearranged according to the priority order of the packets indicated by the added priority data PRO.

Figure 5:
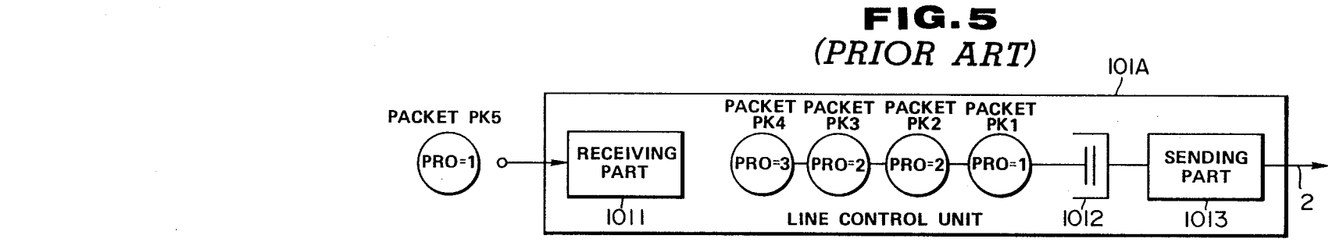
FIGS. 5 and 6 are schematic diagrams showing specific examples of packet queue control of a line control unit according to a prior art congestion control method with use of packets each having such a structure as shown in FIG. 4, respectively.
Figure 6:
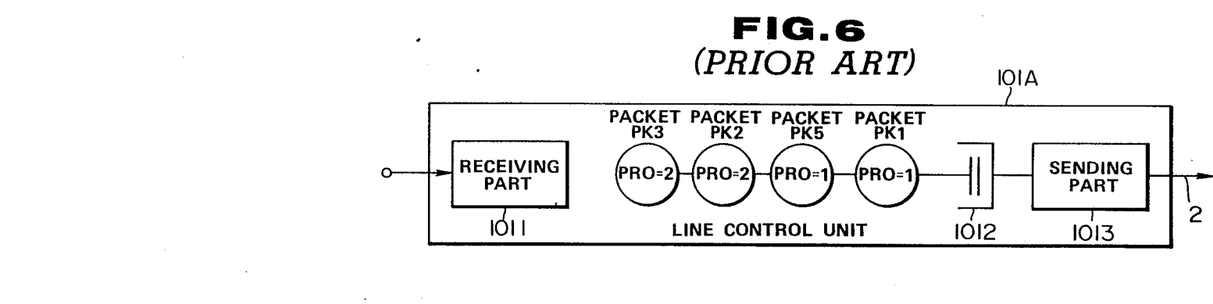

For example, under such a condition that, in the (sending) line control unit 101A of one of the packet switching apparatuses, packets PK1 (PRO=1), PK2 (PRO=2), PK3 (PRO=2) and PK4 (PRO=3) are arranged in the priority order (assuming that the smaller the value of priority data PRO is the higher priority) and are temporarily stored in the queuing part 1012, if a new packet PK5 added with a priority data "PRO=1" of the highest priority is input to the line control unit 101A as shown in FIG. 5, then the unit 101A collates the priority data of all the packets PK1 to PK5 and rearranges these packets on the basis of the priority order of the packet priority data to temporarily accept and hold the packets (including the packet PK5) in the queuing part 1012. Assuming for the brevity of explanation that the queuing part 1012 has a packet holding capacity (the maximum number of packets capable of holding therein) of "4", then the line control unit 101A performs a congestion control over these packets in such a manner as to discard through the above rearranging operation the packet PK4 (PRO=3) added with the priority data of the lowest priority among the packets PK1 to PK5. As a result, the packets PK1, PK2, PK3 and PK5 are rearranged as shown in FIG. 6 according to the priority order in the order of the packets PK1 (PRO=1), PK5 (PRO=1), PK2 (PRO=2) and PK3 (PRO=2), and are held in this order in the queuing part 1012. Accordingly, in this case, such an undesirable situation as the terminal data packet is discarded can be naturally eliminated by always adding a high priority data such as "PRO=1" to the terminal data packet.

In this way, according to the above congestion control method, such important data as the terminal data and the like can be reliably and effectively protected. However, this congestion control method, as the great strain under the employment of such important data protection feature, also inevitably involves such a new disadvantage that follows.

That is, according to the above congestion control method, since the priority order for the respective packets is determined based on the allowance for the data discard at the time of the congestion, data having a strong demand for time immediateness or real time but allowable for the data discard such as the voice data will have a priority lower than data having a not so strong demand for real time but not allowable for the data discard such as the terminal data. For this reason, at the time of the congestion, the voice data packet is rearranged as located after the terminal data packet so that the voice data packet is always located in the latter part of the queue and, in addition to it, the overflow the of queue causes the voice data packet located in the rear part of the queue to be preferentially discarded. This results in that the voice data, though having a strong immediateness or real time demand, will be delayed in the transmission and in certain cases, be discarded. The delay of the transmission of the voice data and the preferential discard of the voice data will mean to produce an unnatural reproduced voice, leading to remarkable deterioration of the speech quality. This, of course, cannot satisfy the intended communication characteristics of the packet communication network which realizes the integration or generalization of a plurality of types of media such as telephone sets and data terminals.

SUMMARY OF THE INVENTION

In view of the above circumstances, the present invention has been made, and an object thereof is to provide a congestion control method for packet switching apparatuses in a packet communication network which integrates or generalizes a plurality of types of media such as telephone sets and data terminal to realize one-dimensional operation of these types of media by means of packets having a common structure, and which realizes, in a packet congestion mode, flexible packet communication according to the types of various communication data while avoiding such undesirable effects of the data-priority determining method as mentioned above.

In accordance with the present invention, the above object is attained by preparing a plurality of different types of priority data depending on the sorts of various communication data and adding the individual priority data to the respective packets.

In a preferred embodiment of the present invention, two types of priority data, that is, a first priority data indicative of the priority order of time immediateness or real time and a second priority data indicative of the priority order of the degree of allowance for data discard, are prepared so that, with respect to such a data packet as the aforementioned voice data packet having a strong time-immediateness demand and a high allowance, i.e., a low necessity for the data discard, the first priority data indicative of a high priority and the second priority data indicative of a low priority are added to the data packet; and so that, with respect to such a data packet as the aforementioned terminal data packet having not so strong time-immediateness demand and a high data necessity, the first priority data indicative of a relatively low priority and the second priority data indicative of a high priority are added to the data packet.

When such congestion control as mentioned above is carried out on the basis of the plurality of types of priority data, and more specifically, when the above voice data packets are rearranged preferentially as located in the front part of the packet queue in the packet congestion mode, for example, in the above example mentioned above, the voice can be reproduced without any delay and even the occurrence of discard of the voice data packets allows the discarded voice data packets to be returned to the front part of the queue immediately after the overflow of the queue has been solved, whereby such broken voice or the like problem can be suppressed to a minimum extent. In addition, even if the terminal data packets are rearranged undesirably as located in the backward part of the packet queue to cause a slight delay in the processing, the highly undesirable possibility that these terminal data packets are discarded can be made negligible. In this way, according to the present invention, flexible packet communication can be realized in the most preferable form according to the types of data to be handled.

BRIEF DESCRIPTION OF THE DRAWINGS

FIGS. 10A and 10B shows a flowchart showing the control operation executed within the packet switching apparatus in the preferred method.

DESCRIPTION OF THE PREFERRED EMBODIMENT

An embodiment of the present invention will be described by referring to the attached drawings. It is assumed in the present embodiment that the communication network itself has substantially the same arrangement as that shown in FIG. 1, and therefore further explanations of the network will be omitted.

The present invention is directed to a system of one-dimensionally handling the packet communication having various communication characteristics. In the following embodiment, with regard to such a data packet as the aforementioned data having a strong time-immediateness demand but a high allowance for data discard (i.e., the discard of the data having less effect on the system), the immediateness priority of the data packet is made high and the data discard allowance (or the data necessity) of the packet is made low (high). With regard to such data packet as the aforementioned terminal data having a relatively low time-immediateness demand but having a high data necessity, the immediateness priority of the data packet is made low and the data necessity priority of the data packet is made high. That is, the present embodiment is arranged so that packets comprising data from such various terminals as telephone sets or data terminals have respectively two types of priorities (immediateness priority and necessity priority) indicative of the respective priority orders of the different demands and, in a packet queue congestion mode, the major demands for the respective data packets are simultaneously satisfied according to the two types of priorities. With such an arrangement, there can be realized such characteristics that the aforementioned voice data packets are rearranged, in the queue congestion mode, as located in the front part of the queue for their earlier processing, but when the queue becomes full with packets, the voice data packets tend to be discarded; whereas the aforementioned terminal data packets are rearranged as located in the rear part of the queue for their later processing, but even when the queue becomes full, the terminal data packets tend to be not discarded.

Figure 7:
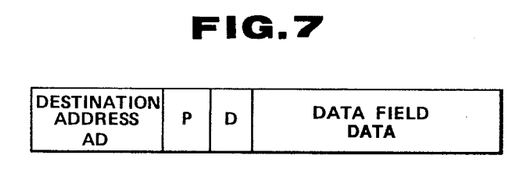
FIG. 7 is a schematic diagram showing a structure of a packet used in an embodiment of a congestion control method for packet switching apparatuses in accordance with the present invention.

FIG. 7 shows a data format of a packet used in the present embodiment to realize such characteristics. More specifically, the packet comprises a destination address AD, a data field DATA, an immediateness priority data P indicative of the aforementioned immediateness priority (that is, the degree of real time necessity), and a necessity priority data D indicative of the aforementioned necessity priority (the degree of undesirable data discard). The immediateness priority data P is set to have a higher priority order for a higher degree of real-time necessity of the data field DATA in the packet, while the necessity priority data D is set to have a higher priority order for a higher degree of undesirable data discard of the data field DATA. Assume now that, by way of example, number "1" denotes the highest priority order and the larger number denotes the lower priority order. Then, in such a data packet as the voice data having a strong immediate demand but having a high data discard allowance, the immediateness priority data P is set to be high ("1") and the necessity priority data D is set to be low (for example, "4"). In such a data packet as the terminal data having a relatively low immediateness demand but having a strong data necessity demand, on the other hand, the immediateness priority data P is set be be low (for example, "2" or "3") and the necessity priority data D is set to be high (for example, "1"). These priority data P and D are added by the associated low speed line adaptor 103 to the corresponding packet during preparation of the packet. In the line control unit 101A or 101B, these priority data P and D are used to control the queue during congestion of its queuing part.

Figure 8:
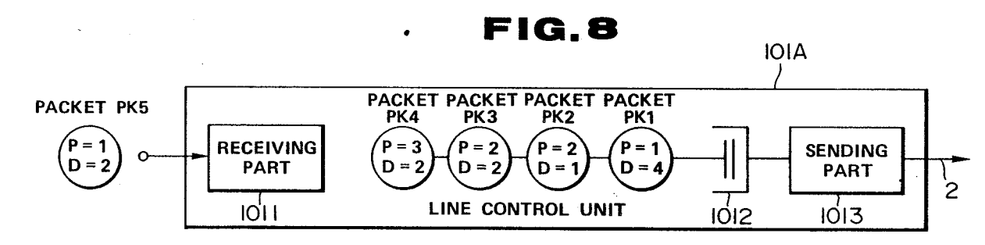
FIGS. 8 and 9 are shematic diagrams showing specific examples of packet queue control of a line control unit in the preferred method with use of packets each having such a structure as shown in FIG. 7, respectively.
Figure 9:
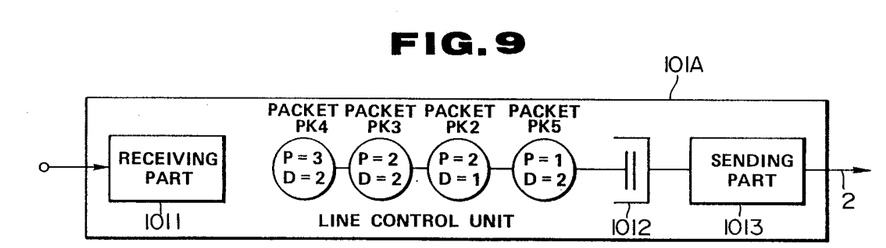

Explanation will next be made, by way of example, as to a specific example of control operation of the sending line control unit 101A in each of the packet switching apparatuses, by referring to FIGS. 8, 9 and 10. FIGS. 8 and 9 show, in a model form, specific queuing examples of the sending line control unit 101A after and before reception of packets, respectively; while FIG. 10 shows control flowcharts of packet sending and receiving controls executed under the sending line control unit 101A, respectively.

Referring first to FIG. 10, the sending line control unit 101A concurrently executes roughly two type of control, i.e., a packet sending control (FIG. 10(a)) and packet receiving control (FIG. 10(b)) according to the then peripheral conditions or situations.

More specifically, the line control unit 101A, when the associated communication line 2 is put in an own-station-packet sendable state (more accurately, when a proper frame signal for packet transmission actually circulating between the respective packet switching apparatuses arrives at its own line control unit 101A via the associated communication line 2, the receiving line control unit 101B and the switch unit 102), judges the sendable state of the line 2 (step A11 in FIG. 10(a)), and sends out the leading packet of the queue through the sending part 1013 to the communication line 2 when the queue part 1012 holds some packets PK (step A12 in FIG. 10(a)). The sending control operation is repetitively executed during every time period when the own-station-packet sendable state of the communication line 2 is satisfied. Concurrently with this, if there is a packet PK (which will be referred to as the i-th packet $PK_i$, hereinafter) to be sent out from the own station switch unit 102, then the line control unit 101A judges that the packet $PK_i$ has been received at its receiving part 1011 (step A21 in FIG. 10(b)), and repetitively executes the reception control operation each time receiving the packet to realize the aforementioned characteristics on the basis of the priority data $P_i$ and $D_i$.

In this reception control operation, the line control unit 101A uses a suitable threshold value 1 to decide whether or not the number of packets to be temporarily held in the queue part 1012 has reached a level close to its maximum judging from the capacity of the queue part 1012, that is, whether or not the queue part 1012 has reached its congestion state. More specifically, the line control unit 101A monitors with use of the threshold value 1 the number of all packets within the line control unit after receiving the packet $PK_i$. When deciding that the monitored number of all packets does not reach the threshold value 1 (step A22 in FIG. 10(b)), the line control unit 101A, as its normal control, merely inserts the received packet $PK_i$ in the last of the queue independently of the priority data $P_i$ and $D_i$ of the received packet $PK_i$ (step A23 in FIG. 10(b)), and waits for the next packet reception (step A21 in FIG. 10(b)). In monitoring the packet number (step A22 in FIG. 10(b)), only when the number of all packets including the received packet $PK_i$ exceeds the threshold value 1, that is, only when the line control unit 101A decodes that the queue 1012 was put in the congestion state, the line control unit 101A executes the reception control to realize the communication characteristics.

Such reception control will be described in more detail with reference to FIG. 10(b).

After deciding at step A22 that the queue part 1012 is put in the congestion state, the line control unit 101A then monitors whether or not the number of all packets including the received packet $PK_i$ has reached the maximum packet holding capacity of the queue part 1012 plus 1 (step A24 in FIG. 10(b)). When the line control unit 101A decides that the all packet number does not reach the "maximum+1", the unit 101A inserts the received packet $PK_i$ in the queue so that the packets in the queue are arranged in the immediateness priority order on the basis of the immediateness priority data $P_i$ of the received packet $PK_i$ (step A25 in FIG. 10(b)). Thereafter, the line control unit 101A waits for the next packet reception (step A21 in FIG. 10(b)). The packet array already obtained based on the immediateness priority of the queue is executed when or each time the packet number first exceeds the congestion judgment threshold value as a result of monitoring the packet number at the step A22. Accordingly, so long as this condition is satisfied thereafter, the received packet is merely inserted in the queue at the corresponding position determined by the immediateness priority data of the received packet and the packet array based on the immediateness priority is maintained, as explained above.

In the monitoring procesing at the step A24, if the line control unit 101A judges that the packet number of packets including the received packet $PK_i$ has reached "the maximum packet holding capacity of the queue part 1012 plus 1", that is, judges that the reception of the packet $PK_i$ causes the overflow of the queue part 1012, then the unit 101A references the necessity priority data D of all the packets in the queue and discards the packet having the lowest priority therein from the queue (step A26 in FIG. 10(b)). When the packet to be discarded is not the received packet $PK_i$, that is, when the necessity priority data $D_i$ of the packet $PK_i$ is not the lowest priority, the line control unit 101A inserts the received packet $PK_i$ in the queue so that the packets remaining in the queue are arranged in the immediateness priority order based on the immediateness priority data $P_i$ of the packet $PK_i$ (step A27 of FIG. 10(b)). Thereafter, as in the above case, the line control unit 101A waits for the next packet reception (step A21 of FIG. 10(b)).

Accordingly, assuming now for the convenience of explanation that the queue part 1012 having only a 4-packet capacity is in its congestion state as shown in FIG. 8 (in this case, the threshold value 1 for congestion judgement is set to be, for example, "3"), then the packet rearrangement based on the immediateness priority is carried out so that four packets are arranged in the queue part 1012 as shown in FIG. 8. This arrangement is based largely on the immediateness priority data P and thus the voice data packet or the like having the weighted priority data P is located in the front part of the queue. As a result, in the congestion mode, concurrently with the aforementioned sending control (FIG. 10(a)), the voice data packet is preferentially sent out onto the line 2 and the quality of the reproduced voice is maintained without any delay.

Under such a condition as shown in FIG. 8, if the line control unit 101A receives a new packet PK5 added with the immediateness priority data P=1 and the necessity priority data D=2, then the unit 101A discards the packet PK1 (P=1, D=4) having the lowest necessity priority among the received packet PK5 and the packets PK1 to PK4 in the current queue according to the rule based on the necessity priority data D of these packets to accept the received packet PK5 and then rearranges, as shown in FIG. 9, the remaining packets in the queue according to the rule based on the immediateness priority data P. This results in that the received packet PK5 having the highest immediateness priority is located at the top of the queue, while the packets (D=2) having a relatively high necessity priority can remain in the queue without being discarded though located in the last part of the queue. The aforementioned terminal data packet having a weighted necessity priority data D corresponds to the packet PK4 or the packet PK2 having the highest priority data D.

In such circumstances where the line control unit 101A cannot resist executing the aforementioned packet discard, the line control unit 101A is usually designed to send such an emergency signal as a busy signal or the like to a terminal (in particular, a telephone set terminal) to be controlled to restrain the data output of the terminal and to thereby minimize the wasteful packet discard.

In accordance with the present invention, in the congestion mode of the packet queue, such a packet having a strong immediateness demand as the voice data packet is rearranged preferentially as located in the front part of the queue for voice reproduction without delay and even when such a packet is subjected to a discard, the packet can be restored to the front part of the queue immediately after the solution of the overflow of the queue, as has been explained in the foregoing. As a result, the occurrence of the discontinuation in the reproduced voice can be minimized and such a packet as the terminal data packet having a strong necessity demand can be rearranged in the rear part of the queue, whereby there can be realized very little possibility that the packet is discarded, though the processing of the packet causes a slight delay.

Figure 11:
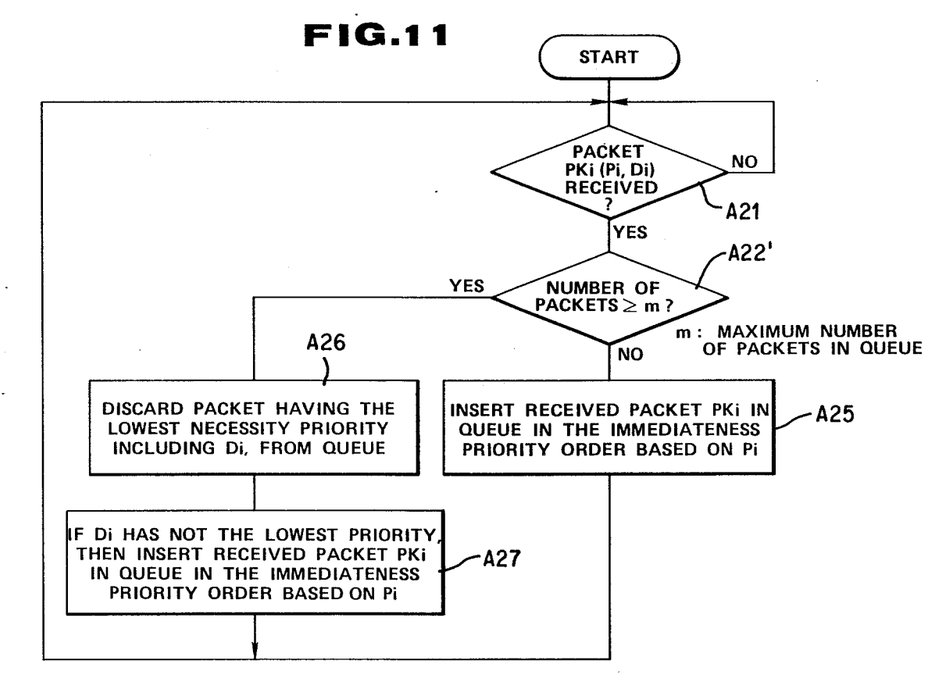
FIG. 11 shows flowcharts of other examples of reception control operation of the line control unit.

In the foregoing embodiment, the congestion judgement threshold value l has been set with respect to the number of packets temporarily held in the line control unit, the line control unit is in a congestion state when the packet number exceeds the threshold value l and has executed the reception control on the basis of the aforementioned two sorts of priority data. However, other reception control may be employed, so long as, in short, the array of the queue can be controlled so that major demands for packets are satisfied at the same time according to the immediateness and necessity priority contents in the priority data of the packets. For example, (1) as shown in FIG. 11, packet rearrangement is always effected on the basis of the immediateness priority without provision of the threshold value l and the packet discard is effected on the basis of the necessity priority when the number of packets exceeds the maximum packet holding capacity m of the queue; or (2) the threshold value l is provided but the mere insertion of the received packet in the last part of the queue (step A23 of FIG. 10(b)) is not carried out, and packet rearrangement (the insertion of the received packet at the corresponding position of the queue based on the immediateness priority) is carried out based on the immediateness priority when the number of packets does not exceed the threshold value l, while the packet discard based on the necessity priority and the packet rearrangement based on the immediateness priority are carried out concurrently.

Although the foregoing explanation has been made as to only the sending line control unit 101A among the line control units of the respective packet switching apparatuses in the foregoing embodiment as well as the exemplary transmission and reception control operations thereof, the receiving line control unit 101B may be arranged to execute the congestion control in substantially the same manner.

In connection with the latter case, even when the entire packet communication network is designed to be subjected to the congestion control based on the respective sending line control units 101A, packet transfer can be realized with high reliability and fairly good efficiency, but in the case where the destinations of packets transmitted from a plurality of packet switching apparatuses are concentrated on a packet switching apparatus, the congestion may take place in the receiving line control unit 101B. In such a case, accordingly, when the congestion control is executed even in the respective receiving line control units 101B in substantially the same manner as the above case except that the communication line 2 and the switch unit 102 are exchanged in their packet input/output (reception/transmission) directions, more effective packet communication can be realized.

Furthermore, the two types of priority data, i.e., the immediateness and necessity priority data have been employed in the foregoing embodiment, but it goes without saying that such selection is arbitrary and a plurality of any other priority data may be used so long as these data indicate the different priorities for different demands.

What is claimed is:

1. In a packet switching apparatus interconnected by associated communication lines to one or more other packet switching apparatuses, wherein data packets are output from various types of terminals and are temporarily held in a queue for exchange between the packet switching appartuses, a congestion control method comprising the steps of:

attaching a plurality of types of priority data indicating different priorities for different demands to each of the data packets; and controlling the queue when a new data packet is input to the queue to satisfy major demands for the data packets concurrently according to said plurality of types of attached priority data of said new data packet and of all the data packets held in the queue.

2. A congestion control method as set forth in claim 1, wherein said plurality of types of priority data comprise a first priority data indicative of the degree of immediateness priority and a second priority data indicative of the degree of necessity of priority, and the queue controlling step further includes rearranging the order of the data packets in said queue so that the data packets attached with a higher first priority data are sequentially arranged closer to a top part of the queue, and determining a discard order of the data packets in the queue so that the data packets attached with said lower second priority data are discarded on a preferential basis.

3. A congestion control method as set forth in claim 2, wherein said data packets to be exchanged and transferred include a voice packet transferred between telephone set terminals and a terminal data packet transferred between data terminals, and the attaching step includes attaching said voice data packet with a high first priority data and a low second priority data, and attaching said terminal data packet with a low first priority data and a high second priority data.

4. A congestion control method as set forth in claim 1, wherein the queue has a predetermined capacity and the queue controlling step includes setting a threshold value according to the capacity of said queue for determining whether said queue is in a congestion state, and includes further controlling the queue to satisfy major demands for the data packets concurrently when the number of data packets temporarily held in the queue exceeds said threshold value.

5. A congestion control method as set forth in claim 2, wherein the queue has a predetermined capacity and the queue controlling step includes setting a threshold value according to the capacity of said queue for determining whether said queue is in a congestion state, and includes further controlling the queue to satisfy major demands for the data packets concurrently when the number of data packets temporarily held in the queue exceeds said threshold value, thereby sequentially arranging the data packets attached with said higher first priority data to the top part of the queue and discarding the data packets attached with said lower second priority data on a preferential basis.

6. A congestion control method as set forth in claim 3, wherein the queue has a predetermined capacity and the queue controlling step includes setting a threshold value according to the capacity of said queue for determining whether said queue is in a congestion state, and includes further controlling the queue is to satisfy major demands for the data packets concurrently when the number of data packets temporarily held in the queue exceeds said threshold value, thereby sequentially arranging the data packets attached with said higher first priority data closer to the top part of the queue and discarding the data packets attached with said lower second priority data on a preferential basis.

* * * * *